March 5, 1935.  W. THORNER  1,993,463
DISTANCE FINDER FOR PHOTOGRAPHIC CAMERAS
Filed Jan. 12. 1933
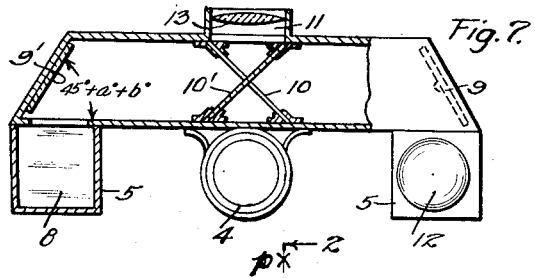
Fig. 7.
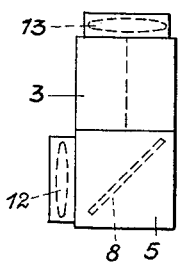
Fig. 3.
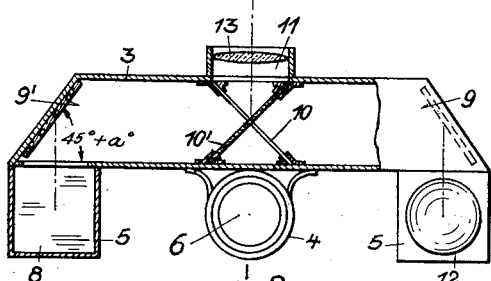
Fig. 1.
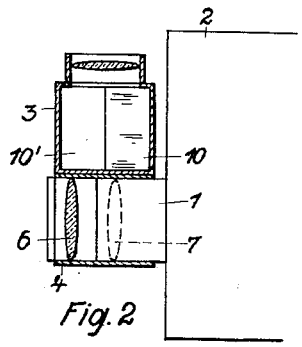
Fig. 2.
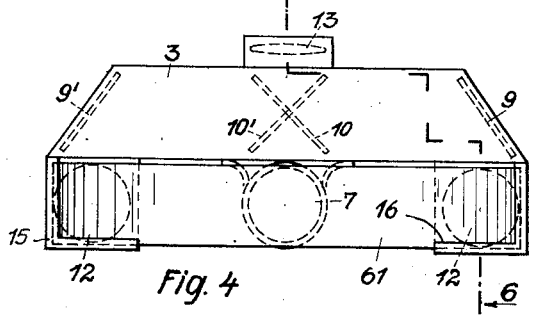
Fig. 4.
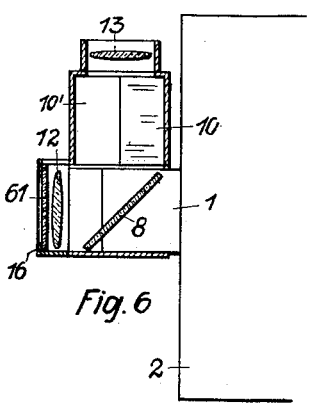
Fig. 6.
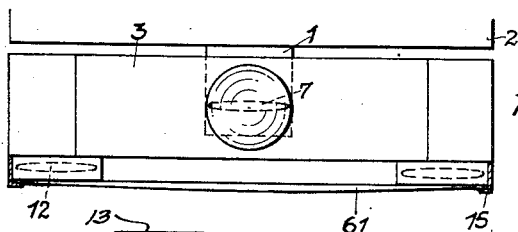
Fig. 5.
Fig. 8.
Fig. 9.
Inventor
Walther Thorner
by
Frank Reinford
Attorney Patented Mar. 5, 1935

1,993,463

UNITED STATES PATENT OFFICE 1,993,463

DISTANCE-FINDER FOR PHOTOGRAPHIC CAMERAS

Walther Thorner, Berlin, Germany, assignor to Zeiss Ikon A.-G., Dresden, Germany, a joint-stock company of Germany Application January 12, 1933, Serial No. 651,303
In Germany April 13, 1931

8 Claims. (Cl. 95—44)

My invention relates to improvements in distance-finders or range-finders for photographic cameras, and more particularly for cameras of the type in which a lens stands in definite and invariable spatial relation to the sensitized film or plate. Such a camera may be, and in the practice of my invention is, adapted to the taking of photographs of objects remote from the camera at different distances by means of supplementary applicable and removable lenses. The object of the improvements is to provide a distance-finder which can be manufactured at low cost, and which gives good results as to accuracy and rapidity of operation. My invention is based on the perception that for ordinary photographic work, instead of measuring or estimating the distance at which the subject to be photographed is remote from the camera and adjusting accordingly a given lens unit in its position relatively to the sensitized plate or film, it is possible to provide a lens unit which may itself be adapted to one or another of a plurality of subject-distances, and then, having made proper adaptation of the lens, to move the camera so far as may be necessary along the line of sight, in order to establish with precision the corresponding subject-distance. More particularly my improved distance-finder is designed for use in connection with a front lens or a set of front lenses adapted to be placed on the main lens of the camera for adapting the same to the distance of the subject from the camera. My invention in preferred form consists in providing an attachment (ordinarily a plurality of attachments) for cameras each of which comprises a supplemental front lens, adapted when combined with the main lens of the camera to establish another particular range of focus for the camera, and a distance-finder by means of which (bringing the camera nearer to or removing it to a greater distance from the subject) that particular range may be established. In the use of the attachment the operator at first determines the distance from which the photograph of the subject should be taken, and which may be say 1, 3 or 5 yards, and applies the attachment including the appropriate front lens to the main lens of the camera. Then looking through the distance-finder which is connected with the said attachment, he moves the camera so far as may be necessary, bringing it nearer to or withdrawing it to a greater distance from the subject to be photographed, until the distance-finder indicates that the range is correct. An attachment of this type may be manufactured at low cost, because the distance-finder is constructed for indicating a single distance.

For the purpose of explaining the invention several examples embodying the same have been shown in the accompanying drawing, in which the same letters of reference have been used in all the views to indicate corresponding parts. In said drawing, Fig. 1 is an elevation of the attachment partly in section and viewed in the direction of the optical axis of the front lens, Fig. 2 is a sectional elevation taken on the line 2—2 of Fig. 1, Fig. 3 is an elevation viewed from the right in Fig. 1, Fig. 4 is an elevation similar to the one illustrated in Fig. 1 and showing a modification, Fig. 5 is a top plan view of Fig. 4, and Fig. 6 is a sectional elevation taken on the line 6—6 of Fig. 4.

Figs. 7 and 8 are views corresponding to Fig. 1 of attachments differing in detail from the attachment of Fig. 1 and adapted to be applied to a camera in alternation with the attachment of Fig. 1.

Fig. 9 is a view in plan from above of a lens that may be introduced into the pocket of the attachment shown in Figs. 4–6, in place of lens 61.

In the example shown in Figs. 1 to 3 my improved distance-finder attachment is adapted to be placed on the objective 1 of the camera 2, the lens 7 of which is in fixed relation to the sensitized film or plate and so as to produce sharp images of relatively remote subjects. It comprises a tubular casing 3 made from light material such as aluminium and provided with a tube 4 and casings 5, 5 secured to its bottom. Within the tube 4 there is a lens 6 the focal length of which is such that when the attachment is applied the combined lenses (the main lens 7 and the supplemental lens 6) are adapted to produce a sharp image on the sensitized plate or film of a subject remote at a certain distance, say 3 yards, away from the camera. Within the casings 5, 5 there are mirrors 8 which are inclined downwardly and forwardly at an angle of 45°, and above the said mirrors and within the tubular casing 3 there are mirrors 9, 9' which are inclined at angles of 45° upwardly and towards the middle of the tubular casing 3. At the middle of the tubular casing 3 there are a pair of mirrors 10, 10' each having a breadth equal to one half of the breadth of the casing 3 and placed one beside the other and inclined in opposite directions at angles of 45°, the said mirrors 10, 10' being adapted to reflect beams of light coming respectively from the mirrors 9 and 9'. Above the mirrors 10, 10' the casing 3 is formed with an opening 11. At the front side of the casings 5, 5 there are positive lenses 12, and within the opening 11 there is a positive lens 13, the said lenses 12 and 13 and the mirrors cooperating to produce a real image of the subject which is viewed from the point p.

I have described the mirrors 9, 9' to be inclined at angles of 45°. It remains to qualify this feature by explaining that in the preferred embodiment of the invention these mirrors, though inclined at angles that approximate 45°, depart in their degree of inclination minutely from that precise angular value. The interior angle defined by these mirrors (as seen in Fig. 1) is slightly greater than 45°. It will be manifest that, if the angles of inclination of the mirrors 9, 9' were exactly 45°, then the half images seen through lens 13 would coincide only if the subject were remote at infinite distance from the camera; and that in consequence of the minute departure from the forty-five degree position, the half images seen through the lens will coincide when the subject is remote at one particular finite distance—say three yards.

Comparison of Figs. 1 and 7 will show difference in the degree of inclination of mirrors 9, 9', and in this respect only the alternatively applicable attachments differ. The difference in this degree of inclination is, for purposes of illustration, exaggerated. It is actually so minute in magnitude as not to be discernible by ordinary inspection. One attachment adapts the camera for one working distance, another for another.

The apparatus is used as follows:

The operator places the attachment on the camera 2 or the objective 1, he directs the apparatus towards the subject and looks from above (with his eye at a distance of about 25 centimeters away from the lens 13) through the range finder. Normally two images of the subject will appear in the range finder, and the operator moves with the apparatus towards or away from the subject, until the said images of the subject coincide, and a single image thereof appears in the range finder. Thus the reading of the range-finder becomes normal. Now the distance-finder and the objective 1 are at a distance away from the subject which corresponds to the distance to be measured by the distance-finder, and by the lens combination 7 and 6 a well-defined image of the subject is produced in the plane of the sensitized plate or film. Therefore, if the photograph is taken with the front lens 6 placed on the objective 1 a sharp picture is produced.

Ordinarily the user of the camera will have provided himself with a plurality of attachments, such as those shown in Figs. 1 and 7, differing in the degree of inclination of the mirrors 9, 9', and capable when applied of adapting the camera to one particular distance of subject and another—say three such attachments for use in making photographs at distances of 1, 3, and 5 yards, respectively.

By way of alternation, the attachments may be minutely adjusted to afford for the camera particular working distances, not by departures from the forty-five degree position for mirrors 9, 9', but by reducing slightly the spacing at which the lenses 12, 12 stand apart. For every such lens spacing the distance-finder will be adjusted to afford registry of the half-images seen through lens 13, when the subject is remote at one specific distance. Comparison of Figs. 1 and 8 will reveal variation in this particular (exaggerated, for purposes of illustration). And, as in the case first described, the user will provide himself with such attachments as he may desire to adapt his camera to particular ranges—say of 1, 3, and 5 yards.

The distance-finder or distance-finders can be manufactured at low cost, because each distance-finder corresponds to one distance only, and it is not necessary to provide complicated apparatus for setting the mirrors in different positions.

I wish it to be understood that distance-finders of any type may be used in connection with the attachment, and that the distance-finder shown in the figures is merely an example for illustrating the invention. It is indeed, manifestly, quite practicable, employing range-finders of usual structure, including adjustable parts, to set the adjustable parts permanently in correspondence to the refractive powers of the particular lenses, with which they are associated, and then to employ the assembly of range-finder and lens in the manner described.

I have used the term range-finder to characterize one element of the attachment in which my invention is found. It is a range-finder in the sense that, when the camera is moved in the line of sight to and from the subject to be photographed, it indicates the point at which the predetermined range is established; it is not a range-finder in the usual meaning of an instrument to determine the magnitude of an unknown distance.

In Figs. 4 to 6, I have shown a modification of the attachment in which the construction of the distance-finder is similar to that of the distance-finder described with reference to Figs. 1 to 3, and the same letters of reference have been used to indicate corresponding parts. However, in lieu of the front lens 6 shown in the said figures I provide a front lens 61 the size of which is such that it is located and extends, not only in front of the lens 7, but also in front of the lenses 12 of the distance-finder. Preferably, I provide only a rectangular part cut from a circular lens. As shown in the figures, the casings 5 are provided at their front side with a pocket formed by flanges 15 and 16 and open above, and the rectangular front lens 61 is adapted to be dropped from above into the said pocket and raised again and removed and replaced.

The distance-finder of Figs. 4 and 5 is constructed for measuring (in the absence of lens 61) a distance which corresponds to a certain distance between the subject and the camera at which sharp images are produced, and ordinarily the infinite distance. If now a front lens 61 is dropped into the said pocket and in front of the lens 7 and the branches of the distance-finder, which front lens adapts the camera to a distance of say 3 yards, the distance-finder is simultaneously corrected by the said front lens so as to indicate the said distance of 3 yards. In this case, it will be understood that the refractive effect of those marginal portions of the lens 61 that are disposed in front of the mirrors 8 is such that the half images seen through the lens 13 will register when the distance of the subject from the camera is such that the compound lens 61, 7 projects a sharp image of that subject upon the sensitive film of the camera. It is the refractive power of the lens 61 that accomplishes in this case that which in the attachment of Figs. 1 to 3 is accomplished by the minute placement of the mirrors 9, 9', as particularly shown in Figs. 7 and 8. Therefore, the operator needs only the frame of the attachment and the distance-finder carried thereby and a few front lenses 61, 61' etc., of different convexities, and of convexities corresponding to the desired distances of say 1, 3 or 5 yards. When he desires to take a picture at one such particular distance, he need only drop in the pocket formed by the flanges 15 and 16 the appropriate lens 61, 61', etc., and then proceed in the manner described.

I claim:

1. An attachment for a photographic camera including a lens adapted in assembly with the main lens of the camera to establish a particular range of focus other than that for which the camera lacking the attachment is organized, and means for indicating, as the camera with the attachment in place is moved in the line of sight, the point at which such other range of focus is established with respect to a distant object.

2. A distance-finder attachment for photographic cameras, comprising a frame adapted to be placed on the front side of a camera, a distance-finder mounted on said frame and having fixed optical members for measuring distance, and a set of front lenses of different powers adapted to be selectively placed on said frame in position in front both of the lens of the camera and of the said fixed optical members, the parts being so proportioned and adjusted and the optical properties of the said set of lenses being such that each lens cooperating both with the lens of the camera and with the fixed optical members of the distance-finder establishes, with respect to an object at a particular distance of remoteness, sharpness of image in the camera and coincidence of images in the range finder.

3. In combination with a photographic camera a plurality of attachments alternatively applicable to the camera, each attachment such as that defined in claim 1, and the attachments differing from one another in that they are severally adapted when applied to establish different ranges of focus.

4. In combination with a photographic camera a range-finder adapted to indicate as the camera is moved in the line of sight, the point at which a particular distance from a subject under observation is reached, and a lens element applicable to and removable from the camera and when applied establishing in organization with the main lens of the camera a new range of focus and establishing in organization with the range-finder a corresponding value to the range of which the range-finder affords indication.

5. In combination with a photographic camera a range-finder adapted to indicate, as the camera is moved in the line of sight, the point at which the distance from a given subject is equal to the range of focus of the lens of the camera, and a lens element applicable to and removable from the camera and adapted when applied to establish in organization with the main lens of the camera a new range of focus for the camera and to establish in organization with the range-finder a new and corresponding value to the range of which the range-finder affords indication.

6. In combination with a photographic camera a range finder including, in association with elements otherwise fixed in relative positions, a lens element applicable to and removable from position in the range finder and when applied establishing in cooperation with the lens of the camera a range of focus for the camera other than that for which, lacking the said lens element, the camera is organized, whereby, the said lens element being in place, as the camera is moved in the line of sight upon a particular object, the range finder affords indication of the point at which the camera is in focus with respect to that object.

7. In a photographic camera an attachment applicable to and removable from the camera, said attachment including the lens element which in combination with the main camera lens establishes for the camera a focal distance other than that characteristic of the camera when lacking the attachment, the said attachment including also a range finder, the parts being so proportioned that the range finder affords distinctive indication of objects lying at the range of sharp focus of the camera with the attachment in place.

8. A camera equipped with a lens and with range-finding elements and a removable member adapted to cooperate both with the lens of the camera and with the said range-finding elements, the range-finding elements borne by the camera being adapted to indicate those objects that lie at the range of sharp focus of the camera both when the removable element is present and when the removable element is absent.

WALTHER THORNER.